No. 745,546. PATENTED DEC. 1, 1903.
E. W. WHEELWRIGHT.
COMPOUND OF PHOSPHORUS AND SULFUR AND METHOD OF MAKING SAME.
APPLICATION FILED JULY 14, 1902.

NO MODEL.

No. 745,546.

Patented December 1, 1903.

UNITED STATES PATENT OFFICE.

EDWIN WHITFIELD WHEELWRIGHT, OF BIRMINGHAM, ENGLAND.

COMPOUND OF PHOSPHORUS AND SULFUR AND METHOD OF MAKING SAME.

SPECIFICATION forming part of Letters Patent No. 745,546, dated December 1, 1903.

Application filed July 14, 1902. Serial No. 115,541. (No specimens.)

*To all whom it may concern:*

Be it known that I, EDWIN WHITFIELD WHEELWRIGHT, a subject of His Majesty the King of Great Britain, residing at Acock's Green, Birmingham, England, have invented certain new and useful Improved Compounds of Phosphorus and Sulfur and Methods of Manufacturing Same, of which the following is a specification.

When phosphorus is added to sulfur or sulfur to phosphorus at a temperature of 165° centigrade or mixtures of these elements are heated at temperatures not below 165° centigrade, they combine to form sulfids of phosphorus. Sesquisulfid of phosphorus ($P_4S_3$) may be prepared by adding phosphorus to sulfur or sulfur to phosphorus in the proportions indicated by the above formula. If, however, a greater proportion of white phosphorus than that required to form sesquisulfid of phosphorus is used, products are obtained of colors from pale orange to rich crimson, according to the quantity of phosphorus used; and this invention relates to such compounds and to the methods of manufacturing same.

According to this invention if the compounds are to be used in the manufacture of matches (and they are suitable for this among other purposes) they may contain between five and fifty parts of sulfur per hundred of phosphorus. The products, speaking generally, consist of mixtures of sesquisulfid of phosphorus, amorphous phosphorus, and subsulfids of phosphorus containing more phosphorus in relation to sulfur than sesquisulfid of phosphorus, and solid solutions of any or all of these substances in one another.

A convenient method of carrying out the process and for removing any free white phosphorus (and compounds which fume in the air) from the main product is as follows, reference being made to the accompanying drawings, in which—

Figure 1:
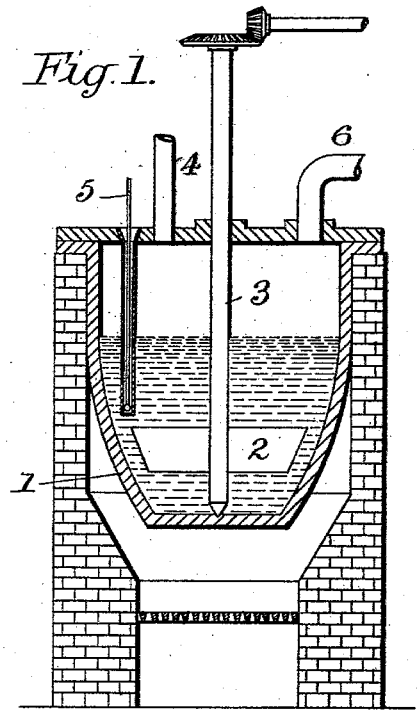
Figure 2:
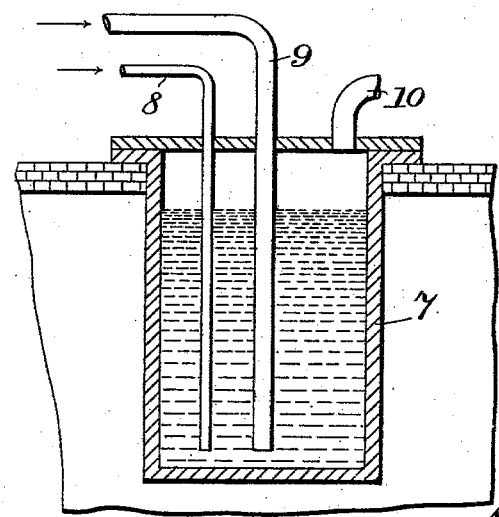

Figure 1 is a sectional elevation of a suitable form of apparatus for carrying out the manufacture of the compounds, and Fig. 2 of apparatus in which the free white phosphorus and compounds which fume in the air can be removed from the main product.

For example, twenty parts, by weight, of sulfur are heated in a suitable vessel 1 to 170° centigrade. To the sulfur one hundred parts, by weight, of white phosphorus are added in small quantities at a time, the mixture in the vessel being stirred, say, by arms 2 on suitably-operated shaft 3. The white phosphorus may conveniently be run into the vessel by pipe 4 from a suitable reservoir, (not shown,) in which it is maintained in a molten state, the reservoir being provided with an exit-pipe and stop-cock. After about twenty-five parts of phosphorus have been added—*i. e.*, the proportion necessary to form sesquisulfid of phosphorus—the whole of the remainder of the phosphorus may be quickly run in and the temperature raised to about 260° centigrade, when the mass will very quickly solidify and become of a dark brick-red color, or, alternatively, the process may be carried out by heating white phosphorus in a vessel 1 to a temperature not less than 170° centigrade and gradually adding the sulfur through pipe 4. The temperature may be read from any suitable temperature-indicator at 5 and the fume lead off by pipe 6, or a mixture of sesquisulfid of phosphorus and white phosphorus in the required portions may be so heated and similar products obtained.

By the above-described process a series of red to orange or yellow compounds or mixtures may be prepared. These compounds or mixtures, which are not spontaneously inflammable, may be ground under water and then dried. The sesquisulfid of phosphorus may be extracted from these mixtures, if desired, by treatment with carbon bisulfid, phosphorus trichlorid, or other solvent. The residue then consists of a red to yellow substance, compound, or mixture which still contains combined sulfur and probably consists of a mixture of amorphous phosphorus with a hitherto-unknown subsulfid of phosphorus or mutual solid solution, as mentioned above. The subsulfid of phosphorus has probably the composition represented by the formula $P_4S$ for the following reason: The less the excess of phosphorus used over and above that required for the sesquisulfid $P_4S_3$ so in proportion does the insoluble residue lose its red tinge and the content of sulfur increase in this residue until finally with a very slight excess of phosphorus in the original mixture the residue is yellow, and then has a composition very nearly that required for $P_4S$. The substances obtained by removing the sesquisulfid of phosphorus are also suitable for the manufacture of matches or for other purposes. The sesquisulfid may be recovered from its solution by evaporation and used again. The sesquisulfid of phosphorus may also be removed from the original compound or mixture by treating it with solution of caustic alkali or alkali carbonates, in which case an insoluble residue will be left containing phosphorus and sulfur.

If any free white phosphorus or possibly certain lower sulfids of phosphorus remain in the mixture or compound obtained by heating phosphorus and sulfur together, as above described, they are liable to oxidize and fume slightly when exposed to the air; but they can be readily removed by oxidation or volatilization by means of steam and air, and for this purpose the compound is finely ground and placed in water in a suitable vessel, such as 7, Fig. 2. The water is kept in a boiling condition either by means of heat externally applied to vessel 7 or by the admission of steam through pipe 8, or by a combination of both methods, and at the same time air is forced in through pipe 9, and the admission of the air and steam keeps the mixture in rapid agitation. Advantageous results can be attained, for example, by taking, say, five kilograms of the finely-ground mixture or compound to each fifteen to thirty liters of water and treating it as above described. After several hours' treatment—the time of course depending on the contents of the compound and on the amount of air and steam employed—the vapor escaping by pipe 10 loses its smoky or fuming character. After this is attained the liquid may be filtered off, the residue washed free from acid by water, and then dried.

What is claimed is—

1. The process of manufacturing solid compounds of phosphorus and sulfur which consists in mixing sulfur and phosphorus at a temperature above 165° centigrade and in proportions in which white phosphorus is present in greater proportion than is requisite for producing sesquisulfid of phosphorus.

2. The process of manufacturing solid compounds of phosphorus and sulfur which consists in adding to the molten bath of one of these substances at a temperature above 165° centigrade the other substance in the proportions of five to fifty parts of sulfur to one hundred parts of phosphorus, stirring the mixture and raising the temperature until the mass solidifies.

3. The process of manufacturing solid compounds of phosphorus and sulfur which consists in mixing these substances at a temperature above 165° centigrade in proportions in which white phosphorus is present in greater proportion than is requisite for producing sesquisulfid of phosphorus, extracting the sesquisulfid of phosphorus therefrom by treating the mixture with a solvent therefor and then recovering the sesquisulfid of phosphorus from its solution by evaporation.

4. As an article of manufacture a compound or mixture varying in color from a red to orange or yellow and formed of phosphorus and sulfur and being free of sesquisulfid of phosphorus although containing more phosphorus in proportion to the sulfur than is found in sesquisulfid of phosphorus.

In testimony whereof I have hereunto set my hand in the presence of two subscribing witnesses.

EDWIN WHITFIELD WHEELWRIGHT.

Witnesses:
LEONARD THOMPSON ALLSOP,
SAML. B. ROUND.